Oct. 31, 1961  R. P. SMITH  3,006,683
VEHICLE DOOR HINGE

Filed July 30, 1958  3 Sheets-Sheet 1

R. P. SMITH
INVENTOR.
BY E. C. McRae
J. R. Faulkner
J. H. Oster
J. J. Roethel
ATTORNEYS Oct. 31, 1961 R. P. SMITH 3,006,683
VEHICLE DOOR HINGE Filed July 30, 1958 3 Sheets-Sheet 2

R. P. SMITH
INVENTOR.

BY E. C. McRae
J. B. Faulkner
F. H. Oster
J. J. Roethel
ATTORNEYS

Oct. 31, 1961        R. P. SMITH        3,006,683

VEHICLE DOOR HINGE

Filed July 30, 1958                                          3 Sheets-Sheet 3

R. P. SMITH
INVENTOR.

BY
E. C. McRae
J. R. Faulkner
T. H. Oster
J. J. Roethel
ATTORNEYS

United States Patent Office 3,006,683
Patented Oct. 31, 1961

3,006,683
VEHICLE DOOR HINGE
Raymond P. Smith, Huntington Woods, Mich., assignor to Ford Motor Company, Dearborn, Mich., a corporation of Delaware
Filed July 30, 1958, Ser. No. 751,997
2 Claims. (Cl. 296—46)

This invention relates generally to vehicle body construction for automotive vehicles and has particular reference to a hinge structure for mounting the doors on the vehicle body.

The continuing trend in automotive vehicle body design featuring longer and wider body shells provided with longer and thicker door structures has created a problem which, at times, is most aggravating to the car purchasing public. The problem is particularly accentuated in the two-door sedan or club coupe style of body in which the door must be of sufficient length to provide access to both the front and rear seats. It is frequently found, particularly when the vehicle is parked in a narrow garage or in a crowded parking lot, that the door cannot be swung open far enough to permit access to or exit from the passenger compartment, as the case may be. More technically stated, with a conventionally hinged door the lateral displacement necessary to provide full opening of the door to permit easy access to the passenger compartment is a function of the length of the door. The longer the door, the greater is the space that must be allowed between the side of the vehicle and the side of an adjacent vehicle or garage wall to permit full opening movement of the door.

A number of solutions to the problem of minimizing the lateral displacement required to provide full opening of the vehicle door have been proposed in the prior art. Some of the proposed solutions provide structures in which there is no lateral displacement of the door, the door being slidable into the wall of the body shell either in a fore and aft direction or up into the roof structure. Such constructions have many disadvantages from both design and manufacturing standpoints in that they unduly complicate the body shell design and construction, are hard to fit properly and to provide with adequate seals, and require cost adding guide and retainer devices.

It has also been proposed in the prior art to construct and arrange the door in hinged sections so that the main section may be manipulated to fold or jack-knife against a support section which is hinged to the body pillar. The main section of the door is movable in such a manner as to be manually maintainable during opening movement substantially parallel or at a slight angle to the plane of the vehicle side on which the door is mounted, thereby decreasing its lateral displacement.

The main disadvantage of this type of structure appears to lie in the inherent difficulty in manually controlling the movement of sectional doors, particularly in the direction of opening movement. Further, during opening movement the mass of the main door section often acquires a momentum which forceably drives the jack-knifing shorter hinged section toward the vehicle body with consequent strain on the hinges and hinge supporting frame members.

It is an object of the present invention to provide an improved door mounting construction and arrangement in which the door comprises a conventional unitary structure so supported or hinged that during its movement from a door closed to a door open position, it is mechanically controlled to move substantially parallel to the plane of the vehicle body side to which it is connected during the initial opening movement and then at only a slight angle to said plane for the remainder of the opening movement.

Briefly stated, the present invention embodies a hinge device mounting a closure structure, such as a vehicle door, on a vehicle body for movement between closed and open positions. The hinge device comprises a longitudinally extending hinge member pivotally connected at one end to the vehicle body hinge pillar and at its other end to the closure structure intermediate the ends of the latter. A control arm is provided, the control arm being pivotally connected to the vehicle body and closure structure for relative movement about pivot axes which are in spaced substantially parallel relation to the pivot axes of the respective ends of the hinge member. The hinge member and control arm are so constructed and arranged as to cause the closure structure to shift bodily outwardly with the plane thereof becoming only slightly angularly displaced relative to its initial position in the plane of the vehicle body in which mounted as said closure structure is moved to an open position. The lateral displacement is a function of the length of the hinge member and the thickness of the door rather than a function of the length of the door.

Other objects and advantages of this invention will be made more apparent as this description proceeds, particularly when considered in connection with the accompanying drawings, wherein.

Figure 1:
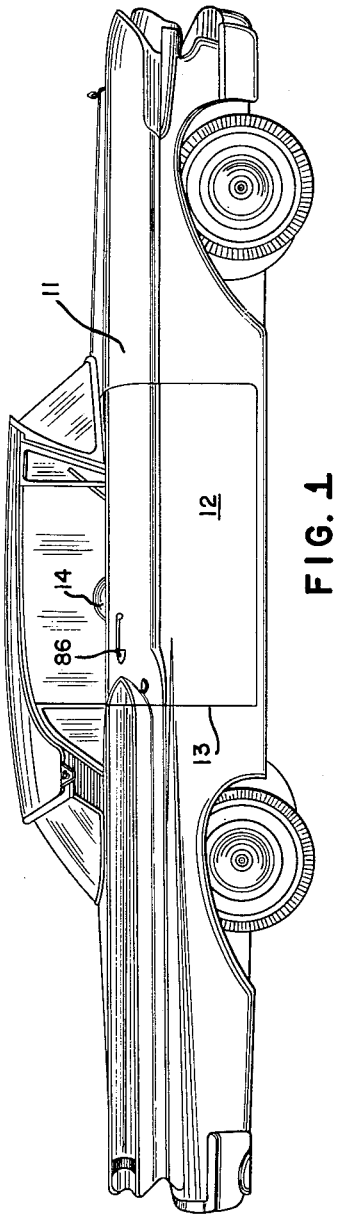
FIG. 1 is a side elevational view of a motor vehicle embodying the present invention.

Referring now to the drawings, and particularly to FIG. 1, there is shown a motor vehicle body 11 having a door 12 which is substantially longer than even the longest doors currently in use on conventional two-door sedans. The length of the door may be judged by the position of its rear edge 13 relative to the front seat back 14. The length of the door is such that substantially full walk-in access is provided to the aisle between the front and rear seats. It will be readily apparent that if the door were hinged in a conventional manner, the lateral displacement required to provide full opening of the door would be such that the door could not be fully opened in most garages or in the space allotted per vehicle in an ordinary parking lot in which vehicles are parked side by side.

The present invention provides a hinge structure adapted to support a vehicle door having even the extreme length of the door 12 in such a manner that the lateral displacement of the door in fully opened position is less than that of a conventionally hinged door.

Figure 3:
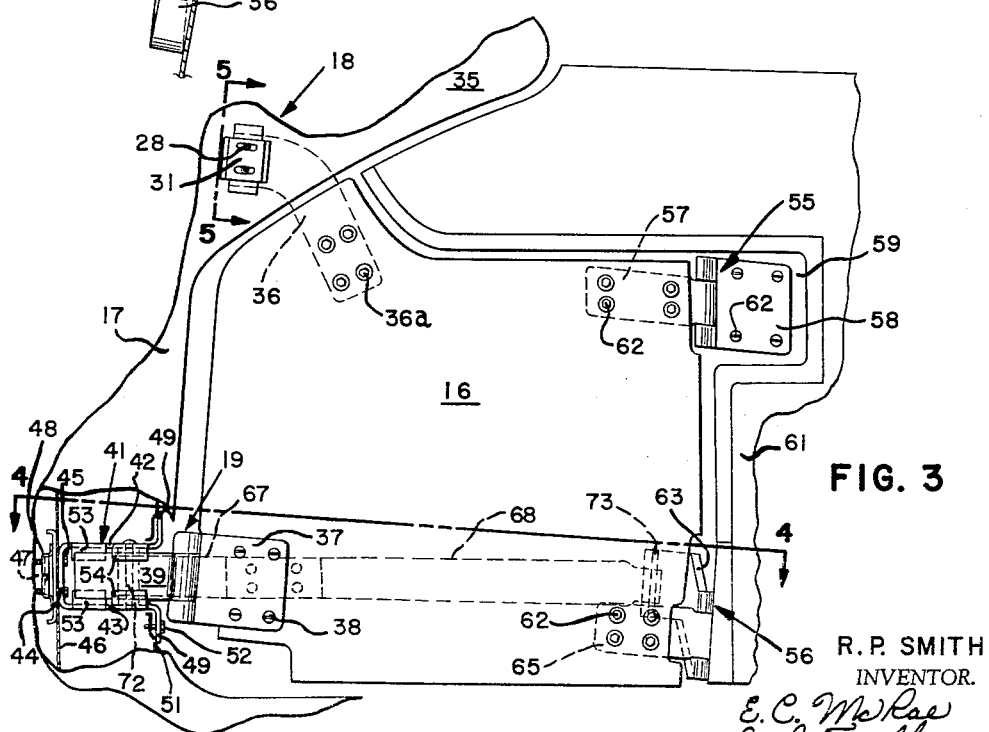
FIG. 3 is a fragmentary side elevation illustrating the relationship of the hinge structure to the vehicle body and vehicle door as it appears from the inner side.

In its illustrated embodiment the hinge structure, generally designated 15, comprises a reinforced panel or hinge member 16 which in closed position of the vehicle door forms an extension of the inner panel of the door. The contour of the panel or hinge member 16 is best seen in FIG. 3. The panel or hinge member 16 is supported on the front body pillar 17 by an upper front hinge assembly 18 and a lower front hinge assembly 19.

Figure 5:
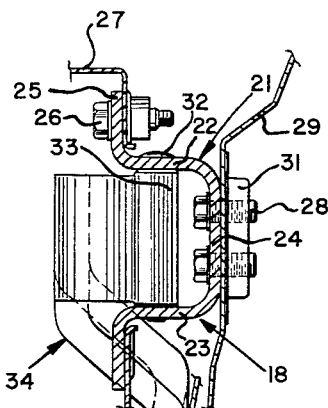
FIG. 5 is a sectional view taken substantially through line 5—5 of FIG. 3 looking in the direction of the arrows.

The upper front hinge assembly 18 comprises a sheet metal cage member 21 of generally U-shaped cross-section (see FIG. 5). The cage member 21 has opposed, substantially parallel, horizontally extending walls 22 and 23 connected by a substantially vertically extending wall 24. The cage member 21 is rigidly mounted within the body pillar, having its attaching flanges 25 secured by bolts 26 to a pillar structural member 27 and its vertically extending wall 24 secured by bolts 28 to a body pillar upper hinge reinforcing plate 29. The bolts 28 are threaded through an anchor plate (not visible) contained within an anchor plate cage 31.

The horizontal walls 22 and 23 form supports for a pintle 32 which is received in a bearing hole provided therefor in the enlarged end portion 33 of the hinge leaf, generally designated 34. As best seen in FIGS. 3 and 5, the hinge leaf 34 has a horizontal portion which extends angularly outwardly and then rearwardly a short distance and is then twisted and angled downwardly to cross over the gap between the overhanging portion 35 of the vehicle cowl and the hinge panel 16. The free end of the hinge leaf 36 is suitably secured to the hinge panel 16 by bolts 36a.

The lower front hinge assembly 19 comprises an ordinary strap hinge having one leaf 37 bolted to the hinge panel 16 by bolts 38 and the other leaf 39 securely held in a hinge bracket 41. The bracket 41 comprises a substantially U-shaped member having upper and lower horizontally extending walls 42 and 43 joined by a vertical wall 44. This bracket is also securely anchored within the body pillar structure, it being held by bolts 45 extending through its vertical wall 44 to a pillar structural member 46. The pillar structural member 46 is backed up by an anchor plate 47 contained within an anchor plate cage 48. The bracket flanges 49 are also secured to a pillar structural member 51 by fastening devices 52. The hinge leaf 39 is held between longitudinally spaced inwardly turned flanges 53 and 54 integral with the upper and lower wall brackets 42 and 43. The one pair of flanges 53 engage the inner side and the other pair of flanges 54 engage the outer side of the hinge leaf 39, see FIGS. 3 and 4. In the illustrated embodiment the hinge leaf 39 is welded to the flanges. It will be readily apparent that provision may be made for bolting or otherwise securing the hinge leaf 39 to the bracket 41.

The end of the hinge panel 16 opposite to that connected to the vehicle body structure, as described above, is hingedly connected to the vehicle door structure 12 by an upper rear hinge assembly, generally designated 55, and a lower rear hinge assembly, generally designated 56.

The upper rear hinge assembly 55 comprises a simple strap hinge having one leaf 57 secured to the hinge panel 16 and the other leaf 58 secured to a suitably reinforced portion 59 of the inner door panel 61. Suitable bolts 62 or the like are used as the hinge leaf fastening devices.

Figure 4:
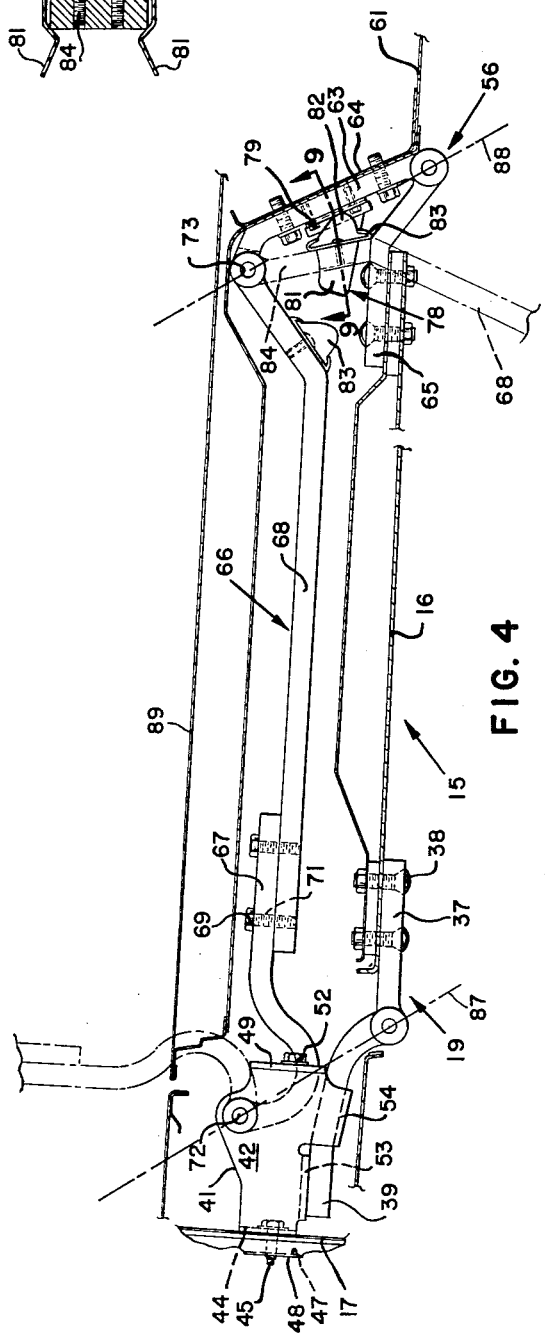
FIG. 4 is a sectional view taken substantially through line 4—4 of FIG. 3 looking in the direction of the arrows.

The lower rear hinge assembly 56, as best seen in FIG. 4, comprises a laterally angularly extending bracket 63 fastened to a reinforced section 64 of the inner door panel 61. The bracket 63 forms one leaf of a conventional strap hinge, the other leaf 65 being secured to the hinge panel 16.

The foregoing structure as described is sufficient to support the vehicle door on the vehicle body. However, it will be readily apparent that the movement of the door would be relatively uncontrolled. An important feature of the present invention is the provision of a control member or arm effective to cause the door to move in a well controlled and well defined movement pattern as it is manually pulled to an open position or pushed to a closed position.

As best seen in FIG. 4, the control arm, generally designated 66, comprises an elongated strap or link made in two sections 67 and 68 which are held together by bolts 69. It will be understood that the section 67 may be provided with slightly elongated bolt receiving holes 71 to permit longitudinal adjustment of the one section relative to the other. The control arm in closed position of the door is concealed between the panel 16 and the outer panel structure 89 of the door.

The arm section 67 is pivotally connected by a pintle 72 to the bracket 42, the same bracket which supports the lower door hinge assembly 19. The arm section 68 is pivotally connected by a pintle 73 to the bracket 63, the same bracket forming one leaf of the lower door hinge assembly 56. The axes of the pintles 72 and 73 are substantially parallel to the pivot axes of the hinge assemblies 19 and 56, respectively.

It should be noted that the vertical plane, represented by the line 87, which includes the axis of the pintle 72 and the pivot axis of the hinge assembly 19 is at a slight angle to the vertical plane, represented by the line 88, which includes the axis of the pintle 73 and the pivot axis of the hinge assembly 56. If projected, the lines 87 and 88 representing the vertical planes would intersect at a point inwardly of the vehicle body. It should be further noted that the center distance between the axis of the pintle 72 and the pivot axis of the hinge assembly 19 is less than the center distance between the axis of the pintle 73 and the pivot axis of the hinge assembly 56. The pivot axes of the front hinge member 19 and the rear hinge member 56 are each located rearwardly longitudinally of the door with respect to the axes of the respective pintles 72 and 73. As a result of this construction and arrangement, the effective length of the control arm 66, i.e., the distance between the pivot axes of the pintles 72 and 73, is slightly longer than the effective length of the hinge panel 16, i.e., the distance between the pivot axes of the hinge assemblies 19 and 56. The foregoing is best seen with reference to FIG. 4, as noted above, and the effect of this relationship will hereinafter become apparent.

To briefly summarize, the vehicle door 12 is mounted on the vehicle body and controlled in its swinging movement by a four bar linkage system. The four bar linkage system comprises a pair of slightly nonparallel arms and two end brackets on which the arms rotate. The pair of arms are the hinge panel 16 and the control arm 66, and the two end brackets on which the arms rotate are the hinge brackets 41 and 63. The brackets 41 and 63, as has been described, are fastened to the forward hinge pillar 17 and the vehicle door 12. The upper hinge assemblies 18 and 55, fastened to the hinge pillar 17 and the door 12, respectively, are merely stabilizing hinges and do not influence the operation of the four bar linkage system.

In a prototype structure the hinge bracket 63 was secured to the door at a position approximately one third the length of the door away from the pillar 17. With the pivot axes of the arms 16 and 66 located proportionately as shown in FIG. 4, the angular relationship of the plane of the door to the center line of the vehicle body as controlled by the four bar linkage system laterally changed 14° from closed to full open position, with the greater displacement occurring at the rear edge of the door. The arms, comprising the hinge panel 16 and control arm 66, revolved through an arc of 115° from closed to full open position. The foregoing values are only exemplary of what may be achieved with the structure embodying the present invention.

Figure 6:
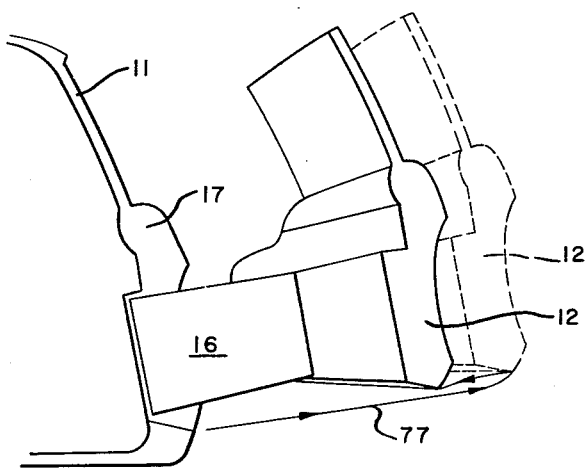
FIG. 6 is a diagrammatic perspective view looking forward from a position at one side and rearwardly of the vehicle illustrating the movement pattern of a vehicle door mounted in accordance with the principles of the present invention.

The effects of mounting a vehicle door in the manner disclosed herein may be more fully explained with reference to the schematic views, FIGS. 6 to 8, inclusive.

Figure 7:
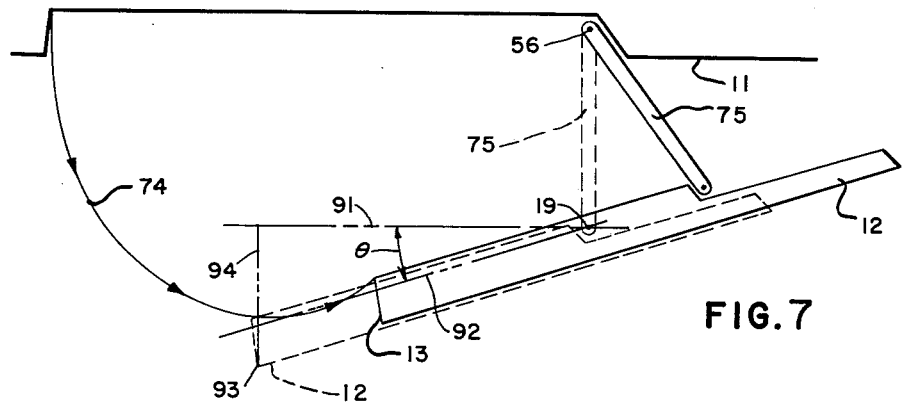
FIG. 7 is a diagrammatic plan view illustrating the door movement pattern when viewed from above the vehicle.
Figure 8:
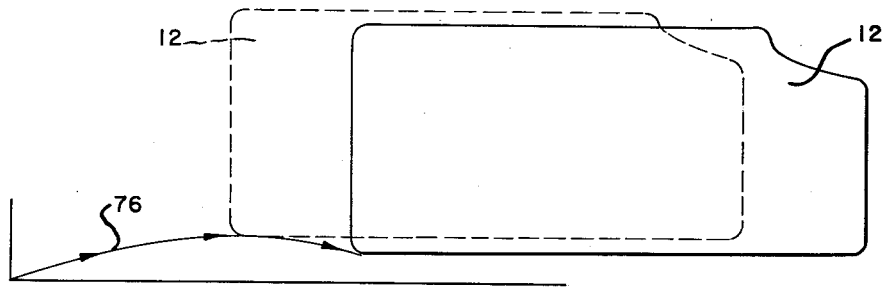
FIG. 8 is a diagrammatic side elevation illustrating the door movement pattern when viewed from the side of the vehicle.

FIG. 7 illustrates the movement path of the door in a horizontal plane as it is moved from a closed to a full open position. In the closed position the door lies flush with the side of the vehicle body. As the door is moved to a full open position its rear edge substantially follows the path indicated by the line 74. The door reaches its maximum lateral displacement when the parallel arms 16 and 66, represented by the single arm 75 in the diagram, are substantially normal to the longitudinal centerline of the vehicle body. Beyond this position the door moves toward the body providing a natural door stop action, to be more fully explained.

It is conventional practice to cant the hinge axis of a vehicle door vertically inwardly from the ground plane to the top of the vehicle body. By so doing the center of gravity of the door is directed slightly downwardly and toward the center of the vehicle so that the door will naturally tend to maintain itself in a closed position. The effect of the canted hinge axis or the vertically inclined hinge centers is best seen in FIGS. 8 and 6. As the door is moved from a closed to a full open position, there is a slight rise and fall as indicated by the line 76 in FIG. 8 and the line 77 in FIG. 6. The high point is reached when the arms 16 and 66 are substantially normal to the longitudinal centerline of the vehicle body. Beyond this point the door drops down slightly. When in the fully opened position the weight of the door acts toward the vehicle body. Thus, a door mounted as described herein has a natural door hold open action as an inherent characteristic of the design.

Figure 9:
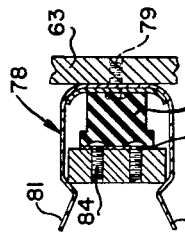
FIG. 9 is a view of the door check and retaining means taken in the direction of the arrow 9 in FIG. 4.

A door checking and retaining device may be provided as shown in FIGS. 4 and 9. This device comprises a U-shaped spring clip 78, see FIG. 9, fastened by screws 79 to the surface of the bracket 63. As the door is swung open the relative movement of control arm section 68 to the bracket 63 is toward the bracket. In full open position of the door the arm section 68 position relative to the bracket 63 is as shown in dot and dash outline in FIG. 4. The arm section 68 in reaching this position passes between the leg portions 81 of the spring clip 78 and is retained therewithin as readily seen in FIG. 9. A rubber bumper 83 held in a suitable clip 82 is secured by screws 84 to arm section 68 in position to pass between the legs 81 of the spring clip 78 to abut the base of the clip. This provides a positive and cushioned door stop.

Figure 2:
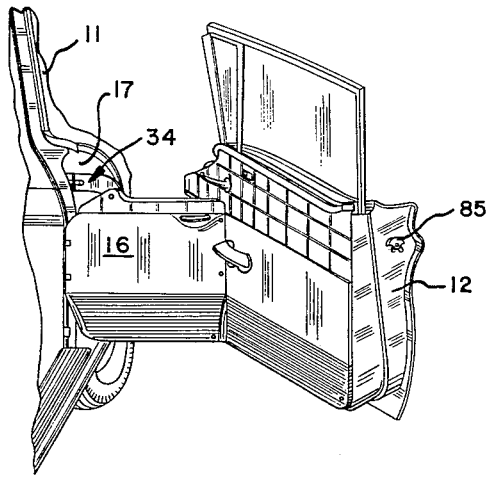
FIG. 2 is a fragmentary perspective view illustrating the vehicle door in an open position.

It will be understood that suitable latch devices, one of which is indicated at 85 (see FIG. 2), will be provided at each end of the door 12 to secure the same in door closed position. Since the latch devices and their mode of operation are structurally independent of the hinge structure and could take various forms, it is not believed necessary for an understanding of the present invention to do more than mention that such devices are utilized as in conventional vehicle body construction.

The operation of the structure embodying the present invention may be described as follows: To open the vehicle door, the door handle 86 is grasped in a conventional manner and the latch device release operator is manipulated to disengage the latch bolt or the like to permit the door to be opened. The door is pulled toward the operator in the same manner as done to open any conventional vehicle door. However, instead of the vehicle door swinging about the hinge axis at the body pillar, the door will move bodily away from the vehicle body. For the first degree of opening movement the plane of the door will remain substantially parallel to the plane of the side of the vehicle body.

To digress a moment, it will be readily apparent that if the door were connected only to the hinge panel, it would be extremely difficult to control its swinging movement. The pulling force exerted at the handle would tend to cause the door to swing erratically about the hinge axis between the door and the hinge panel. The door would probably attempt to maintain parallel relationship with the hinge panel and this would result in a swinging action equivalent to that of a conventionally hung door.

The control arm 66 obviates any such difficulties. The control arm causes the door to follow a pre-determined movement pattern, the construction and arrangement being such that the door reaches its maximum lateral displacement upon the hinge panel 16 and control arm 66 reaching a position normal to the longitudinal centerline of the vehicle.

The movement pattern is such that the door in its initial phase of opening movement shifts bodily laterally outwardly of the vehicle body. The hinge panel 16 and the control arm rotate about their pivotal connections to the body pillar 17, this rotation being in a counterclockwise direction as viewed in FIG. 4. The door is simultaneously rotating about its pivotal connections with the outer ends of the hinge panel 16 and control arm 66, the direction of this rotation being in a clockwise direcion as viewed in FIG. 4. The control arm 66, in effect, pushes the door in the clockwise direction about the pivotal axis of the hinge panel connection to the door. Because the control arm 66 effective length is longer than that of the hinge panel 16, during the clockwise movement of the door its plane is caused to swing relative to its initial position coincident with the plane of the vehicle body side through a slight angle of about 14°, this angle being a matter of design. Obviously, if this angle were permitted to approach the angle of opening of a conventional vehicle door, the advantages derived from the present invention would be non-existent. This is why the prototype constructed was permitted an angular displacement of 14°, this angular displacement being sufficient to permit easy access to the passenger compartment. The same effect could be achieved by a shorter hinge panel length with greater angular displacement or a longer hinge panel length with a lesser angular displacement.

As was stated earlier, the positions of the hinge axes at each end of the hinge panel 16 and the control arm 66, the lengths of the hinge panel 16 and control arm 66, and the place of connection of the hinge panel 16 and control arm 66 to the vehicle door, all as selected for a prototype model resulted in a maximum lateral displacement angle of 14°. The rear edge of the door, as in a conventionally hung door, is the edge which is laterally displaced to the greatest degree. In the present embodiment the rear edge displacement is approximately equal to the effective length of the hinge panel 16 plus the length of the door from the point of connection of the hinge panel to the door multiplied by the sine of the maximum lateral displacement angle. The thickness of the vehicle door and the position of the hinge panel 16 hinge pins connecting the hinge panel to the body pillar will slightly affect the result. This may be best understood with reference to FIG. 7. As illustrated therein, the outermost edge 94 of the door reaches its maximum displacement outwardly of the body substantially at the attainment by the hinge member 16 and control 66, represented by the single arm 75, of a position normal to the longitudinal plane of the vehicle body. The displacement of the outermost edge 93 may be readily calculated. It is substantially the sum of the lengths of the arm 75 plus the length of the line 94, the latter representing the displacement of the edge 93 from a plane passing through the hinge axes of the hinge 19 and parallel to the plane of the vehicle side. The length of the line 94 is the product of the sine of the angle theta ($\theta$), this angle being the angle between the plane 91 and a plane 92 parallel to the longitudinal axis of the door and passing through the hinge axis of the hinge 19, and the length of the door from the hinge axis of the hinge member 19 to the edge 13. However, it will be readily apparent that the lateral displacement of the rear edge of a vehicle door hung in accordance with the principle of the present invention will be substantially less than that of the corresponding edge of a conventionally hung vehicle door if the latter were permitted to swing outwardly through a 90° arc.

In the present embodiment, the hinge panel 16 and control arm 66 are permitted to swing an additional 25° beyond the 90° open position to a full door open position. This additional movement moves the door ahead of the door opening and, although the lateral displacement is decreased, the access opening to the vehicle interior is substantially increased.

Some further advantages of the present invention may be briefly listed, as follows:

(1) Sealing problems are minimized because the initial opening action of the door, normal to the centerline of the vehicle body and normal to the sheet metal skin, eliminates seal wiping action.

(2) The bevels of the door and pillar faces are held to a minimum allowing simple moulding cut off techniques to be used with any section applied mouldings.

(3) Much greater styling freedom is possible in variety and depth of sculptured body surface sections.

It will be understood that the invention is not to be limited to the exact construction shown and described, but that various changes and modifications may be made without departing from the spirit and scope of the invention, as defined in the appended claims.

What is claimed is:

1. In a vehicle body having a body opening and a door associated therewith movable between closed and open positions, a hinge member and a control member each pivotally connected at one of its ends to a body frame member for rotation about adjacent substantially vertical pivot axes, and adjacent substantially vertical pivot means connecting said door to the other ends of said hinge member and control member, the distance between said pivot axes being unequal to the distance between the pivot axes of said pivot means, thereby establishing a nonparallel four-bar linkage system for controlling the movement of said door, said linkage system causing said door to move substantially bodily laterally outwardly of the vehicle body during the initial phase of opening movement and then to bodily swing on said hinge member about the pivot axis of the latter on said body frame member, said hinge member swinging in the direction of opening movement of said door as the latter is swung by said control member in a counterdirection about its pivotal connection to the hinge member, said control member controlling the swinging movement of said door relative to said hinge member so that the plane of the door becomes slightly angularly displaced relative to its initial plane coincident with the plane of the vehicle body opening, said hinge member swinging in excess of ninety degrees from door closed to door opened position, the lateral displacement of the edge of said door which moves furthermost outwardly of said vehicle body during door opening movement being substantially function of the effective length of the hinge member plus the product of the length of the door between said edge and the point of connection to said hinge member multiplied by the sine of the displacement single between a plane parallel to the initial plane of said door in closed position and the plane thereof when said hinge member is normal to said initial plane.

2. In a vehicle body having a body opening and a closure structure associated therewith movable between closed and open positions, a hinge member and a control member each pivotally connected at one of its ends to a body frame member for rotation about adjacent substantially parallel pivot axes, and adjacent substantially parallel pivot means connecting said closure structure to the other ends of said hinge member and control member, the distance between said pivot axes being unequal to the distance between the pivot axes of said pivot means, thereby establishing a nonparallel four-bar linkage system for controlling the movement of said closure structure, said linkage system causing said closure structure to move substantially bodily laterally outwardly of the vehicle body during the initial phase of opening movement and then to bodily swing on said hinge member about the pivot axis of the latter on said body frame member, said hinge member swinging in the direction of opening movement of said closure structure as the latter is swung by said control member in a counterdirection about its pivotal connection to the hinge member, said control member controlling the swinging movement of said closure structure relative to said hinge member so that the plane of the closure structure becomes slightly angularly displaced relative to its initial plane coincident with the plane of the vehicle body opening, the lateral displacement of the edge of said closure structure which moves furthermost outwardly of said vehicle body during closure structure opening movement being substantially a function of the effective length of the hinge member plus the product of the length of the closure structure between said edge and the point of connection to said hinge member multiplied by the sine of the displacement angle between a plane parallel to the initial plane of said closure structure in closed position and the plane thereof when said hinge member is normal to said initial plane.

References Cited in the file of this patent

UNITED STATES PATENTS

| | | |
|---|---|---|
| 859,344 | Silver | July 9, 1907 |
| 2,227,655 | Levy | Jan. 7, 1941 |
| 2,542,605 | Werner | Feb. 20, 1951 |
| 2,564,988 | Muller | Aug. 21, 1951 |
| 2,743,773 | Weiertz | May 1, 1956 |

FOREIGN PATENTS

| | | |
|---|---|---|
| 394,318 | Great Britain | June 9, 1933 |
| 452,679 | Great Britain | Aug. 27, 1936 |